Patented Aug. 15, 1944

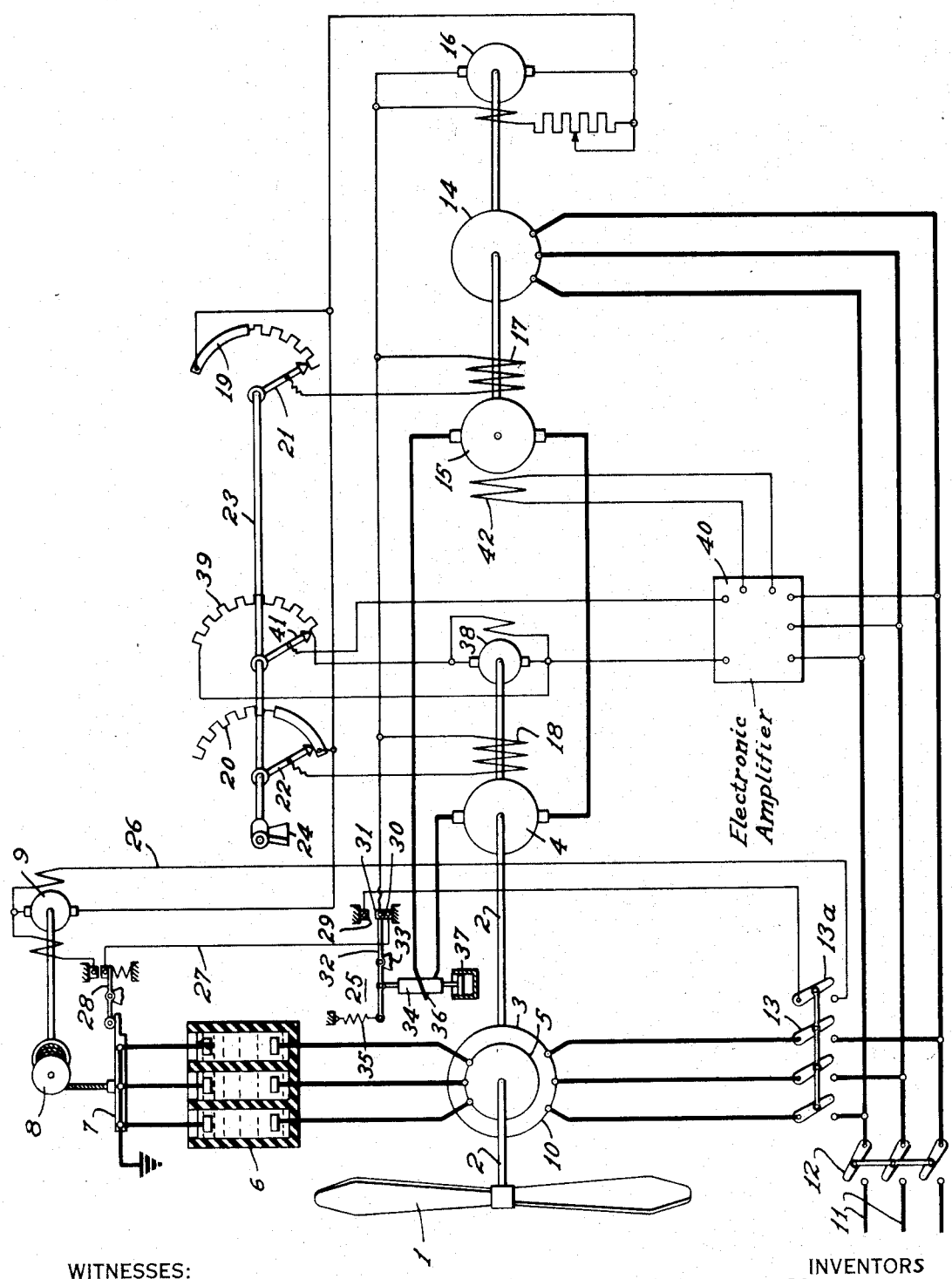

2,356,051

UNITED STATES PATENT OFFICE 2,356,051

VARIABLE-SPEED DRIVE

Clinton R. Hanna, Pittsburgh, and Lee A. Kilgore, Forest Hills, Pa., assignors to Westinghouse Electric & Manufacturing Company, East Pittsburgh, Pa., a corporation of Pennsylvania Application October 30, 1942, Serial No. 463,964

11 Claims. (Cl. 172—274)

This invention relates to a method of and apparatus for providing a variable speed drive, and, more particularly, to an improved drive for operating a varying load such as a wind tunnel drive over a wide speed range.

In variable speed drives the limitations of electric motors from the standpoint of size and range of speed are well known. These limitations have proven material factors in the design of wind tunnels suitable for testing airplanes and airplane parts which are being designed for higher air speed. Since the load on a wind tunnel fan increases as the cube of the speed, it will be apparent that the drive requirements are increased out of proportion to the wind velocity requirements.

From the standpoint of providing a wide range of speed, the direct current motor with a variable voltage power supply from a constant speed generator is particularly desirable for driving variable speed loads such as fans and pumps. Such a form of drive has the desirable characteristic of being inherently stable at its various speeds of operation. However, this form of drive is limited by size and cost to installations of limited capacity incapable of providing the wind tunnel velocities required for present day testing purposes.

The well known alternating current variable speed drive having a wound rotor motor with adjustable secondary resistance has desirable characteristics which render it suitable for driving a variable load at a variable speed such as the fan of a wind tunnel. However, a disadvantage of this type of drive is that it provides a limited range of speed and rather poor speed regulation at its lower speeds of operation when there is a variation in its voltage supply. In wind tunnel operation it is extremely important that the drive be capable of operating the fan at a constant speed for rather long time intervals in order that the necessary observations and test data may be taken.

One of the principal objects of this invention is to provide an electric drive suitable for wind tunnel operation which will provide the advantages of both the direct current motor drive and the alternating current wound rotor drive and which will eliminate the disadvantages of such drives. To this end, this invention contemplates the provision of a direct current motor with variable voltage control for driving a fan over a predetermined speed range and a wound rotor induction motor operable in conjunction with the direct current motor for driving the fan over a higher speed range having as its lower limit of speed a speed substantially the same as the upper limit of speed in the predetermined range provided by the direct current motor alone. By the use of the induction motor, the undesirable increases in cost and size of equipment necessary to provide increased power in direct current drives are eliminated. The use of the direct current motor removes the limitation of the relatively narrow speed range of induction motors and enables good speed regulations to be had in a manner to be described.

Another object of this invention is to provide a variable speed drive comprising a wound rotor induction motor having a variable secondary resistance and a direct current motor together with mechanism automatically operable to adjust the secondary resistance of the wound rotor in response to speed regulations of the direct current motor.

A further object is to provide a speed control system for a wound rotor induction motor comprising a direct current system for supplying a portion of the power to the drive to which the induction motor is connected, and in which the output of the direct current system is regulated to compensate for varying conditions in the alternating current system which would otherwise be effective to vary the speed of the drive.

Other objects and advantages of this invention will become apparent from the following description and accompanying drawing in which the single figure diagrammatically illustrates a variable speed drive constructed in accordance with the principles of this invention.

Referring to the drawing the numeral 1 designates a fan, such as a wind tunnel fan, mounted on a shaft 2 which is adapted to be driven by an induction motor 3 and a direct current motor 4 in a manner to be described. The induction motor illustrated is of the slip ring type having a wound rotor 5 as its secondary and a liquid rheostat 6 for adjusting the resistance of the secondary. The liquid rheostat 6 is provided with a movable member 7 for adjusting the resistance thereof in a manner well known in the art. The position of the movable resistance member 7 is illustrated as controlled by a reel 8 operated by a direct current motor 9 having a split field for effecting operation of the reel 8 in opposite directions to increase or decrease the resistance of the rheostat 6. Energization of the primary 10 of the induction motor 3 from power supply bus bars 11 is controlled by manually operable switches 12 and 13.

Power for operating the direct current motor 4 is provided by a motor generator set comprising a synchronous motor 14 adapted to be connected to the bus bars 11 by the switch 12 and a direct current generator 15 driven by the motor 14. A generator 16 is also driven by the motor 14 and provides a source of direct current for exciting the generator field winding 17 and the motor field winding 18 and for operating the reel motor 9. The fields 17 and 18 are controlled, respectively, by rheostats 19 and 20 having movable members 21 and 22 adapted to vary the resistances of their respective field circuits. The members 21 and 22 are shown as mounted on a common shaft 23 adapted to be operated by a handle 24.

A relay 25 is provided for controlling the operation of the motor 9 in a manner to be described. The split field of the motor 9 as viewed in the drawing comprises a right-hand portion 26 and a left-hand portion 27. Upon energization of the motor 9 through the right-hand portion 26 of its split field, the reel 8 will be operated to lower the member 7 and reduce the resistance in the secondary of the motor 3. Upon energization of the motor 9 through the left-hand portion 27 of its split field, the reel 8 will be operated to raise the member 7 and increase the resistance provided by the rheostat 6. A limit switch 28 is operated by the member 7 when it is raised to the position shown in the drawing, in which position the maximum amount of resistance will be provided by the rheostat 6.

The right and left-hand split field portions 26 and 27 are provided, respectively, with stationary contacts 29 and 30 in their circuits for cooperation with a movable contact 31 constituting a part of the relay 25. An energizing circuit for the motor 9 may be traced from the generator 16 through the right-hand field portion 26 upon engagement of the movable contact 31 with the stationary contact 29. A like circuit for the motor 9 may be traced from the generator 16 through the left-hand field portion 27 upon engagement of the movable contact 31 with the stationary contact 30. As pointed out above, this latter energizing circuit through the left-hand field portion 27 is interrupted by the limit switch 28 when the member 7 is in the position shown in the drawing. The other energizing circuit through the field portion 26 is controlled by a manually operable contactor 13a and is adapted to prevent operation of the motor 9 to reduce the resistance of the rheostat 6 when the induction motor 3 is deenergized. The limit switch 28 and the manually operable switch 13a function to prevent operation of the motor 9 and to maintain the member 7 in its upper position until such time as it is desired to operate the induction motor 3.

The movable contact 31 of the relay 25 is carried by an arm 32 pivotally mounted at 33. A solenoid 34 is pivotally connected to the arm 32 and a spring 35 is provided for biasing the arm 32 to a position with the solenoid 34 in its upperpost position and the movable contact 31 engaged with the contact 30. The solenoid 34 is provided with a coil 36 in the loop circuit connecting the armatures of the generator 15 and the motor 4 for operating the arm 32 and the movable contact 31 against the bias of the spring 35 in a manner to be described. A dashpot 37 is provided for preventing momentary changes of current in the coil 36 from effecting undesired operations of the solenoid 34 and the movable contact 31.

The operation of the parts thus far described is as follows:

When the apparatus is at rest, the parts occupy the relative positions shown in the drawing. To start the apparatus the switch 12 is first closed to start the motor 14. Operation of the motor 14 causes the generator 16 to energize the generator field 17 and the motor field 18. With the control handle 24 in the position shown, maximum resistance is provided by the rheostat 19 in the exciting field 17 of the generator 15 and minimum resistance is provided by the rheostat 20 in the exciting field 18 of the direct current motor 4. As the handle 24 is moved counterclockwise from the position shown in the drawing the arm 21 will operate the rheostat 19 to remove resistance from the circuit of the field 17 and thus gradually bring such field up to full strength. As the field 17 is brought up to full strength the arm 22 of the rheostat 20 will be moved over an elongated copper contact and the field 18 will remain at its maximum value. In this manner the voltage output of the generator 15 will be increased to increase the speed of the motor 4 and of the propeller 1 through the drive shaft 2.

After the field 17 has been increased to its maximum value by removal of the resistance from the rheostat 19, the generator 15 and motor 4 will be operated at capacity and since the load of the fan 1 varies as the cube of its speed it will be seen that additional power will be required in order to increase the speed of the fan 1.

When the generator 15 is delivering rated current the coil 36 in the armature circuit of the generator 15 will operate the solenoid 34 against the bias of the spring 35 to balance the movable contact 31 in a position midway between the stationary contacts 29 and 30. Increases in the current flowing through the coil 36, if of sufficient duration to overcome the time lag provided by the dashpot 37, will function to move the movable contact 31 into engagement with the contact 29. Likewise, decrease in the current flowing through the coil 36 will permit the bias of the spring 35 to become effective for moving the contact 31 into engagement with the contact 30.

To provide the additional power necessary to increase the speed of the fan, the switch 13 may then be operated to energize the primary of the induction motor 3. At the time the switch 13 is thus operated, the switch 13a will be closed thus permitting energization of the right-hand portion 26 of the split field of the motor 9, but the limit switch 28 will still function to prevent energization of the motor 9 through the left-hand portion 27. Although the switch 13 is shown as being manually operable, it is to be understood that operation of the switch 13 may be made automatic when the field 17 reaches its full strength without departing from the principles of this invention.

After energization of the primary 10 of the induction motor 3 further increase in speed may be had by continued rotation of the handle 24 in a counterclockwise direction. Such continued rotation will have no effect on the generator field 17 but will operate the member 22 to insert resistance into the circuit of the motor field 18, thereby reducing the strength of such field. This will cause an increased current to flow through the coil 36, and the solenoid 34 of the relay 25 will function to move the contact 31 into engagement with the stationary contact 29. The motor 9 will then be energized by a circuit which may be traced from the generator 16 through the right-hand portion 26 as described above. The reel 8 will then be operated to lower the member 7 and reduce the amount of resistance provided by the rheostat 6 in the wound rotor secondary circuit. As the rheostat 6 is thus changed the induction motor 3 will be operated to take up more of the load and bring the speed of the fan up to the speed called for by the rheostat 20. As the speed is increased, the current flowing in the coil 36 will be reduced and the movable contact 31 will move to its balanced position. Continued operation of the handle 24 to insert more resistance in the circuit of the field 18 will function in like manner to effect further increases in the speed of the fan 1 by causing the motor 3 to take up greater proportions of the total load. During all this time the field 17 will be substantially constant and the amount of the total load carried by the direct current motor 4 will not change.

If the speed of the propeller 1 and motor 3 decreases by reason of a decrease in the voltage to the primary 10, or for any other reason, below that called for by the setting of the rheostat 20, the coil 36 will function to operate the rheostat 6 and thus bring the motor 3 up to speed in the same manner as is had upon adjustment of the rheostat 20 to insert more resistance in the circuit of the field 18. In other words, decrease in the speed below that called for by the field 18 will result in the coil 36 operating the solenoid 34 to engage the contact 31 with the contact 29 to operate the rheostat 6 and remove resistance therefrom to compensate for the change in speed.

In the event that the motor 3 drives the fan 1 at a speed greater than that called for by the field 18, the motor 4 will function as a generator tending to prevent such increase. When the motor acts as a generator, current will be fed back through the coil 36 and the spring 35 will become effective to engage the movable contact 31 with the stationary contact 30. This will complete the circuit of the motor 9 through the left-hand field portion 27 and the rheostat 6 will be operated by the reel 8 to insert more resistance in the secondary circuit of the motor 3 to cause such motor to produce less power and thus operate at a slower speed.

After the propeller 1 has been brought up to the desired speed it is merely necessary to rotate the handle 24 in a clockwise direction to reduce the speed. Rotation of the handle 24 in a clockwise direction will operate the rheostat 20 to remove resistance from the field circuit 18. The motor 3 will then be operating at a speed faster than that called for by the field 18 and the motor 4 will function as a generator to permit engagement of the contacts 30 and 31 so that the rheostat 6 will be operated by the reel 8 to insert additional resistance in the secondary circuit of the motor 3 and thereby decrease its speed. After the rheostat 20 has been operated to remove all of the resistance from the circuit of the field 18, the switch 13 may be opened to interrupt the connection of the motor 3 to the bus bars 11. As pointed out above, the opening of the switch 13 may be made automatic if so desired. Continued movement of the handle 24 in a clockwise direction will operate to insert resistance in the generator field 17 thus effecting a further slowing down of the propeller or fan 1.

In order to prevent undesired speed changes, a pilot generator 38 is connected to the shaft 2 and is rotated at the same speed as that of the fan 1. The pilot generator 38 has a resistance 39 in its armature circuit and an electronic amplifier 40 is connected in parallel with such armature circuit by a sliding contact 41 adjustably engaged with the resistance 39. This arrangement of the resistance 39 and the adjustable contact 41 provides a potentiometer arrangement for adjusting the direct current voltage input to the amplifier 40. If the speed of the fan 1 is increased due to the movement of the handle 24 in a clockwise direction, the movable contact 41 will be moved so as to feed a smaller proportion of the output voltage of the generator 38 to the amplifier 40. In this manner the voltage of the current input to the amplifier 40 is maintained substantially at a predetermined value and will not increase proportionately with the increase of the speed of the generator 38. The output of the amplifier 40 is fed to an auxiliary generator field 42 in such manner as to effect a speed adjustment to compensate for speed changes due to reasons other than movement of the control handle 24. If the speed of the drive tends to increase, the current fed to the field 42, by the amplifier 40 will decrease the total generator field, thereby reducing its output and slowing down the drive. If the speed of the drive decreases, the amplified current fed to the field 42 will increase the total generator field to speed up the drive and thus compensate for its decrease in speed. The use of the pilot generator 38 is particularly desirable to prevent large speed fluctuations at the time the drive is converted from a direct current drive to a combined direct current and alternating current drive by energization of the induction motor 3. The amplifier 40 forms no part per se of this invention and any suitable type of electronic amplifier or regulator may be used in conjunction with a field 42 which effects the above described results without departing from the principles of this invention. If desired the field 17 may be combined with the field 42, the excitation of the generator 16 in such case being provided by the amplifier 40 instead of the generator 16.

From the foregoing it will be apparent that there is provided a variable speed drive in which the direct current motor 4 functions alone to drive the shaft 2 and the load carried thereby over a predetermined range of speed. Thereafter the combined operation of the direct current motor 4 and the induction motor 3 functions to drive the shaft 2 over a higher speed range having, as its lower limit, the upper speed limit of the predetermined range provided by the use of the direct current motor 4 alone. In practice, it will be found desirable that the upper speed limit of the range provided by the use of the direct current motor 4 alone be in the nature of from about 20% to about 55%, and preferably about 40%, of the highest speed desired. Since the load on the shaft 2 varies with the cube of the speed, it will be seen that at the higher speeds most of the load will be carried by the induction motor 3. It will also be seen that the rated capacity of the direct current motor 4 may be rather small as compared to the rated capacity of the induction motor. For example, the capacity of the induction motor 3 may be in the nature of 10,000 H. P. and that of the direct current motor in the nature of 2,000 H. P. Accordingly, it will be further apparent that the variable speed drive of this invention is capable of producing more power than is possible or practical by the use of a direct current drive alone. By the use of the direct current motor 4 in combination with the induction motor 3 an overall speed range substantially the same as would be provided by a direct current motor drive is had with the same advantages from the standpoint of speed regulation.

Since numerous changes may be made in the above described construction and different embodiments of the invention may be made without departing from the spirit and scope thereof, it is intended that all the matter contained in the foregoing description or shown in the accompanying drawing shall be interpreted as illustrative and not in a limiting sense.

We claim as our invention:

1. A variable speed drive for a load carrying shaft comprising a direct current motor operable alone for driving said shaft over a predetermined speed range, a wound rotor induction motor operable jointly with said first motor for driving said shaft over a second speed range having as its lower limit a speed substantially the same as the upper limit of said predetermined range, a common current source for energizing said motors, control means between said source and said direct current motor for controlling said direct current motor to vary the speed of said shaft over said predetermined range, electric resistance means for controlling said induction motor and common actuating means associated with said different control means to jointly control both of said motors to vary the speed of said shaft over said second range.

2. A variable speed drive for a load carrying shaft comprising a direct current motor for driving said shaft, means controlling the output of said motor for varying the speed of said shaft over a predetermined range, a wound rotor induction motor having an external rotor circuit and being operatively connected to said shaft and jointly operable with said direct current motor for driving said shaft over a second speed range greater than said predetermined range, and common control means operative to adjust the speed of said direct current motor and to control said rotor circuit of said induction motor to vary the speed of said shaft over said second speed range without overloading said direct current motor.

3. A variable speed drive for a load carrying shaft comprising a direct current motor for driving said shaft, means controlling the output of said motor for varying the speed of said shaft over a predetermined range, a wound rotor induction motor operatively connected to said shaft and having a rotor circuit containing variable resistance means, means for adjusting said resistance means to control the output of said induction motor to supply power additional to that supplied by said direct current motor for driving said shaft over a speed range greater than said predetermined range, and common actuating means for operating said different control means in a predetermined relation to each other.

4. A variable speed drive for a load carrying shaft comprising a direct current motor for driving said shaft, means controlling the output of said motor for varying the speed of said shaft over a predetermined range, a wound rotor induction motor operatively connected to said shaft and having a rotor circuit containing variable resistance means, a second variable resistance means for varying the speed of said direct current motor without changing the power output thereof, and means responsive to the setting of said second resistance means for varying said first resistance means to control the output of said induction motor and produce the additional power necessary for driving said shaft at the speed called for by the setting of second resistance means.

5. A variable speed drive for a load carrying shaft comprising a direct current motor for driving said shaft, a source of power supply for said motor comprising a direct current generator, means for varying the output of said generator to vary the speed of said shaft over a predetermined range, and means for varying the speed of said shaft over a greater speed range comprising field control means for adjusting the field of said motor without materially altering the power output thereof, a wound rotor induction motor arranged for driving said shaft and having a rotor circuit containing variable resistance means, and means for adjusting said resistance means and thereby the output of said induction motor according to the power requirements necessary to drive said shaft at the speed called for by the setting of said field control means.

6. A speed control system comprising, in combination, a load carrying shaft, an induction motor and a direct current motor mechanically interconnected and jointly operable for driving said shaft, manually adjustable means for controlling said motors so as to impose increasing load on said direct current motor up to a given maximum and thereafter imposing additional load on said induction motor, and speed control means for said shaft comprising a pilot generator connected to said shaft for varying the output of said direct current motor in response to changing speed conditions of said shaft.

7. A speed control system comprising, in combination, a load carrying shaft, a direct current motor for driving said shaft over a predetermined speed range, an induction motor operable jointly with said direct current motor for driving said shaft over a second speed range greater than said predetermined range, manually adjustable means for controlling said motors so as to impose increasing load on said direct current motor up to a given maximum and thereafter imposing additional load on said induction motor, and means for maintaining the speed of said shaft in either of said ranges comprising a pilot generator connected to said shaft and operable in response to changing speed conditions thereof to vary the output of said direct current generator to compensate for such changes.

8. A variable speed drive for a load carrying shaft comprising a direct current motor for driving said shaft, a source of power for said motor comprising a constant speed generator, field regulating means for varying the output of said generator to vary the speed of said shaft over a predetermined range, a wound rotor induction motor operatively connected to said shaft, variable resistance means in the rotor circuit of said induction motor, and means controlling the operation of both of said motors to vary the speed of said shaft over a second speed range greater than said predetermined range comprising field adjusting means for said direct current motor, and relay means responsive to the setting of said field adjusting means for varying the resistance in said rotor circuit.

9. A drive as claimed in claim 8 together with means for maintaining the speed of said shaft constant for a given setting of said motor field adjusting means comprising a pilot generator connected to said shaft for varying the generator field regulating means and thereby the output of said direct current motor to compensate for speed variations of said shaft.

10. A variable speed drive for a load carrying shaft comprising a direct current motor and an alternating current motor both in driving connection with said shaft, a direct current generator for energizing said direct current motor, circuit means arranged for supplying field energization to said direct current motor and said generator and containing control means for inversely varying said field energizations so as to start said motor with high energization while supplying low field energization to said generator and to reduce said motor field energization at increasing generator field energization for increasing the speed of said motor, means for controlling the speed of said alternating current motor, and actuating means connected with both said control means for operating them in a given relation to each other in order to impose increasing load on said direct current motor up to a given speed limit and imposing additional load on said alternating current motor at higher speeds.

11. A variable speed drive for a load carrying shaft comprising a direct current motor and an alternating current motor both in driving connection with said shaft, a motor generator set including a direct current generator connected to said direct current motor, a common source of alternating current connected to said set and said alternating current motor, circuit means arranged for supplying field energization to said direct current motor and said generator and containing control means for varying the field energization of said generator and direct current motor relative to each other so as to regulate the speed of said direct current motor within a lower range of speeds, means for controlling the speed of said alternating current motor within an adjacent range of higher speeds, and actuating means connected with both said control means for operating them in a given relation to each other.

CLINTON R. HANNA.
LEE A. KILGORE.